United States Patent
Persson et al.

(10) Patent No.: US 9,524,515 B2
(45) Date of Patent: Dec. 20, 2016

(54) METHOD AND SYSTEM FOR LOGGING AND PROCESSING DATA RELATING TO AN ACTIVITY

(71) Applicant: Fishbrain AB, Västra Frölunda (SE)

(72) Inventors: Jens Persson, Göteborg (SE); Marcus Fransson, Västra Frölunda (SE); Johan Attby, Mölndal (SE)

(73) Assignee: Fishbrain AB (SE)

( * ) Notice: Subject to any disclaimer, the term of this patent is extended or adjusted under 35 U.S.C. 154(b) by 142 days.

(21) Appl. No.: 14/099,132

(22) Filed: Dec. 6, 2013

(65) Prior Publication Data

US 2014/0164375 A1    Jun. 12, 2014

Related U.S. Application Data

(60) Provisional application No. 61/733,948, filed on Dec. 6, 2012.

(30) Foreign Application Priority Data

Dec. 6, 2012   (SE) .................................... 1251389-1

(51) Int. Cl.
| | | |
|---|---|---|
| G06F 7/00 | (2006.01) | |
| G06F 17/00 | (2006.01) | |
| G06F 17/30 | (2006.01) | |
| G06Q 30/02 | (2012.01) | |
| G06Q 30/06 | (2012.01) | |
| G06Q 50/02 | (2012.01) | |

(52) U.S. Cl.
CPC ...... *G06Q 30/0267* (2013.01); *G06Q 30/0255* (2013.01); *G06Q 30/0261* (2013.01); *G06Q 30/0631* (2013.01); *G06Q 50/02* (2013.01)

(58) Field of Classification Search
CPC .................... G06F 17/30289; G06F 17/30528; G06F 17/30386; G06F 17/30
USPC .......................................................... 345/633
See application file for complete search history.

(56) References Cited

U.S. PATENT DOCUMENTS

| 4,445,178 A | 4/1984 | Scheer et al. | |
| 8,527,483 B2 * | 9/2013 | Vaananen | H04W 4/02 |
| | | | 706/16 |

(Continued)

FOREIGN PATENT DOCUMENTS

WO          0142992 A1      6/2001

OTHER PUBLICATIONS

International Search Report and Written Opinion for Application No. PCT/SE2013/051469 dated Mar. 13, 2014.

(Continued)

*Primary Examiner* — Susan Chen
(74) *Attorney, Agent, or Firm* — Lerner, David, Littenberg, Krumholz & Mentlik, LLP (57) ABSTRACT

The resent invention relates to a system for gathering and assembling information based on data received from one or several mobile terminals, the system comprising: one or several mobile terminals, and a central processing unit. The data at least relates to a position, environmental information and a tool used by a user of the mobile terminal for carrying out an activity and the central processing unit is configured to: process said data, assemble a unique information based on said data, said unique information comprising optimized data for carrying out said activity.

13 Claims, 8 Drawing Sheets

(56) References Cited

U.S. PATENT DOCUMENTS

| | | | |
|---|---|---|---|
| 9,043,349 B1* | 5/2015 | Lin | G06F 17/30253 |
| | | | 382/257 |
| 2003/0100966 A1 | 5/2003 | Byrne et al. | |
| 2004/0133347 A1* | 7/2004 | Britt | G01C 15/00 |
| | | | 702/1 |
| 2005/0228581 A1 | 10/2005 | Taboada | |
| 2008/0138777 A1* | 6/2008 | Rapoza | G09B 19/00 |
| | | | 434/238 |
| 2011/0013485 A1* | 1/2011 | Maguire | G01S 15/89 |
| | | | 367/88 |
| 2012/0144723 A1* | 6/2012 | Davidson | A01K 85/01 |
| | | | 43/17.6 |
| 2012/0265623 A1* | 10/2012 | Zhu | G06Q 30/06 |
| | | | 705/16 |
| 2013/0222371 A1* | 8/2013 | Reitan | G06T 19/006 |
| | | | 345/419 |
| 2014/0058812 A1* | 2/2014 | Bender | G06Q 30/0209 |
| | | | 705/14.12 |
| 2014/0111542 A1* | 4/2014 | Wan | G06F 17/30253 |
| | | | 345/633 |

OTHER PUBLICATIONS

Swedish Office Action from Application No. 1251389-1 dated Jul. 12, 2013.

* cited by examiner

METHOD AND SYSTEM FOR LOGGING AND PROCESSING DATA RELATING TO AN ACTIVITY

CROSS-REFERENCE TO RELATED APPLICATIONS

The present application claims the benefit of the filing date of U.S. Provisional Patent Application No. 61/733,948 filed Dec. 6, 2012, and claims priority from Swedish Application No. 1251389-1 filed Dec. 6, 2012, the disclosures of which are hereby incorporated herein by reference.

TECHNICAL FIELD

The present invention relates to a method and a system for gathering, processing and providing data to a user about an event in general and an outdoor activity, such as hunting, fishing or the like.

BACKGROUND

Some activities, especially outdoor activities such as fishing, hunting or the like have a large number of practitioners. The activities are normally practiced alone or in groups of few people.

Using positioning tools, such as GPS built into a mobile device, e.g. iPhones® and Android® compatible phones or devices, it is possible to users, without data or phone signal, to see their location. This is especially advantageous when carrying out an outdoor activity outside a cellular network.

There are a number of apps (applications) for facilitating outdoor activities for anglers and hunters. These apps normally allow user to receive information about the area of the activity and tools needed. Usually the activities gather data from the users and provide them to other users.

SUMMARY

What is needed is a system that allows user to provide and receive data preferably in real-time, and which includes additional data and information for carrying out the activity in an optimal way.

For these reasons a system for gathering and assembling information based on data received from one or several mobile terminals. The system comprising: one or several mobile terminals, and a central processing unit. The data at least relates to a position, environmental information and a tool used by a user of the mobile terminal for carrying out an activity and the central processing unit is configured to: process said data, assemble a unique information based on said data, said unique information comprising optimized data for carrying out said activity.

BRIEF DESCRIPTION OF THE DRAWINGS

Reference is made to the attached drawings, wherein elements having the same reference number designation may represent like elements throughout.

DETAILED DESCRIPTION

The following detailed description refers to the accompanying drawings. The same reference numbers in different drawings may identify the same or similar elements. The term "image," as used herein, may refer to a digital or an analog representation of visual information (e.g., a picture, a video, a photograph, animations, etc.).

The term "audio" as used herein, may include may refer to a digital or an analog representation of audio information (e.g., a recorded voice, a song, an audio book, etc.).

In the following the invention will be described with reference to an exemplary embodiment relating to fishing and angler activity. However, the invention may be utilized for other outdoor activities such as hunting, sports, climbing, mushroom picking, etc.

Figure 1:
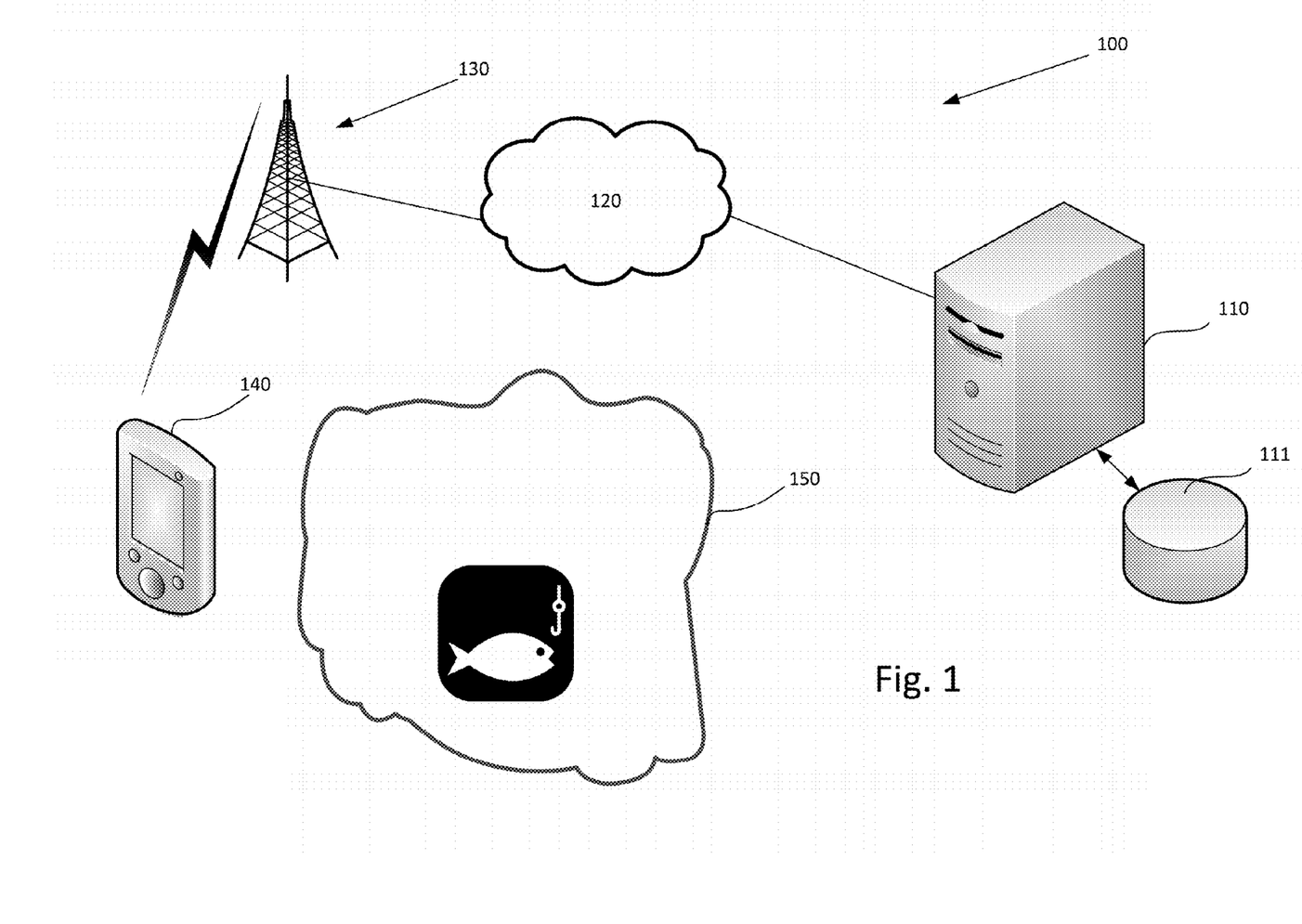
FIG. 1 is a diagram of an exemplary system in which methods and systems described herein may be implemented.

FIG. 1 illustrates an exemplary system 100 embodiment of the present invention comprising a server 110, a computer network 120 a communication network 130 and a mobile device 140.

The mobile device 140 is exemplified as a mobile cellphone, or so called smart phone carried by the user, in this case an angler.

The user of the smartphone 140 runs a computer program (app) on the device which connects it to the server 110 through the communication network 13 and computer network 110 when he is fishing around for example a lake 150.

The app may be configured collect data from angler when the angler initiates the app (or initiated automatically) and when the app is started the user or the app can log fishing trips, catches and moments and the data is stored in a database 111 of the server 110.

Figure 2:
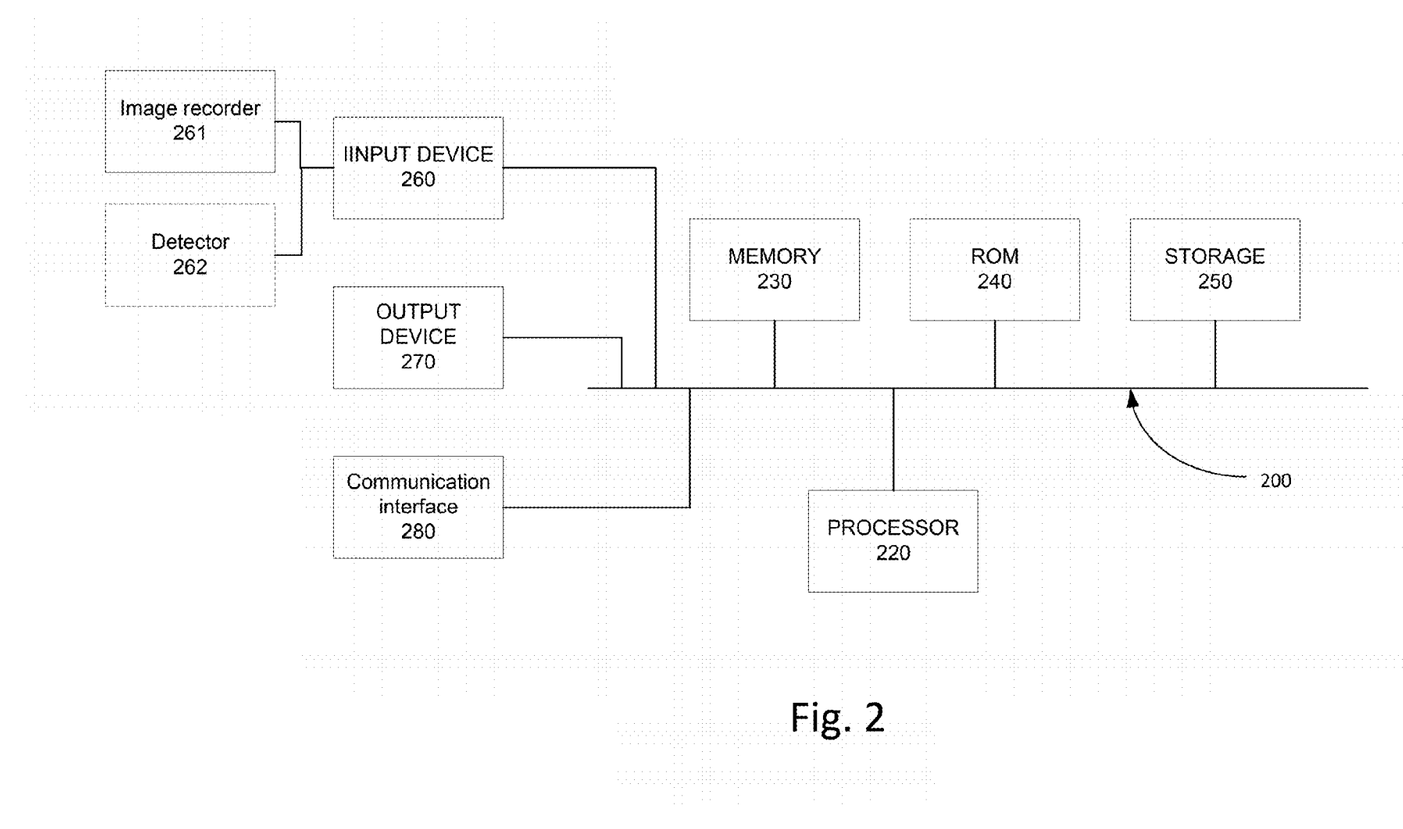
FIG. 2 is a diagram of an exemplary device system in which methods and systems described herein may be implemented.

FIG. 2 is a diagram of an exemplary mobile device system 200 in which methods and systems described herein may be implemented. System 200 may include a bus 210, a processor 220, a memory 230, a read only memory (ROM) 240, a storage device 250, an input device 260, an output device 270, and a communication interface 280. Bus 210 permits communication among the components of system 200. System 200 may also include one or more power supplies (not shown). One skilled in the art would recognize that system 100 may be configured in a number of other ways and may include other or different elements.

Processor 220 may include any type of processor or microprocessor that interprets and executes instructions. Processor 220 may also include logic that is able to decode media files, such as audio files, video files, multimedia files, image files, video games, etc., and generate output to, for example, a speaker, a display, etc. Memory 230 may include a random access memory (RAM) or another dynamic storage device that stores information and instructions for execution by processor 220. Memory 130 may also be used to store temporary variables or other intermediate information during execution of instructions by processor 220.

ROM 240 may include a conventional ROM device and/or another static storage device that stores static information and instructions for processor 220. Storage device 150 may include a magnetic disk or optical disk and its corresponding drive and/or some other type of magnetic or optical recording medium and its corresponding drive for storing information and instructions. Storage device 250 may also include a flash memory (e.g., an electrically erasable programmable read only memory (EEPROM)) device for storing information and instructions.

Input device 260 may include one or more conventional mechanisms that permit a user to input information to the system 200, such as a keyboard, a keypad, a directional pad, a mouse, a pen, voice recognition, a touch-screen and/or biometric mechanisms, etc. Output device 270 may include one or more conventional mechanisms that output information to the user, including a display, a printer, one or more speakers, etc. Communication interface 280 may include any transceiver-like mechanism that enables system 200 to communicate with other devices and/or systems. For example, communication interface 280 may include a modem or an Ethernet interface to a LAN. Alternatively, or additionally, communication interface 280 may include other mechanisms for communicating via a network, such as a wireless network. For example, communication interface may include a radio frequency (RF) transmitter and receiver and one or more antennas for transmitting and receiving RF data.

System 200, consistent with the invention, provides a platform through which a user may play and/or view various media, such as music files, video files, image files, games, multimedia files, etc. System 200 may also display information associated with the media played and/or viewed by a user of system 200 in a graphical format, as described in detail below. According to an exemplary implementation, system 200 may perform various processes in response to processor 220 executing sequences of instructions contained in memory 230. Such instructions may be read into memory 230 from another computer-readable medium, such as storage device 250, or from a separate device via communication interface 280. It should be understood that a computer-readable medium may include one or more memory devices or carrier waves. Execution of the sequences of instructions contained in memory 230 causes processor 220 to perform the acts that will be described hereafter. In alternative embodiments, hard-wired circuitry may be used in place of or in combination with software instructions to implement aspects consistent with the invention. Thus, the invention is not limited to any specific combination of hardware circuitry and software.

Figure 3:
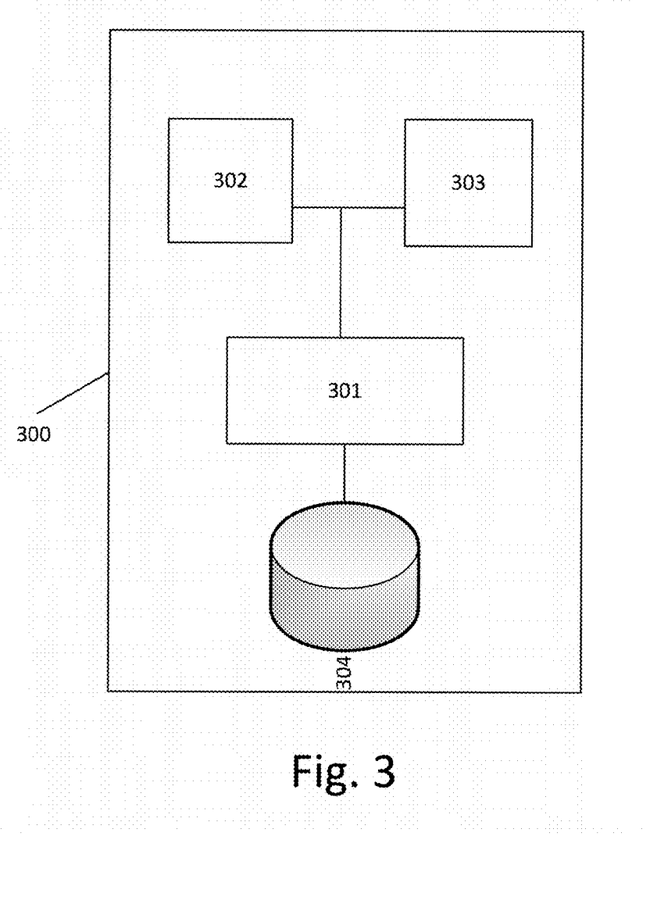
FIG. 3 is a diagram of an exemplary server system in which methods and systems described herein may be implemented.

The server 300 for executing the teachings of the invention may comprise a central processing unit 301, communication interface 302, user interface 303 and a data storage unit (database) 304. Additional memory units (ROM, RAM) imbedded in the central processing unit or separately arranged may also be present.

As mentioned earlier, the invention is described with reference to an exemplary embodiment relating to fishing.

Returning now to FIG. 1, in a fishing example, the user uses his mobile device/smartphone to enter and receive information. The data that is collected by the server 130 when the user is logging a fishing trip may comprise:

1. Fishing for: may manually be selected by the user from the database of fish species. This means that the anger enters information about the type of fish he/she will try to catch.
2. Bait used: The database of baits may be structured in bait categories, brands, product groups and colours. The baits database is collected and is kept up to date by a script that crawls bait manufacturers' homepage for new baits. The bait database may be maintained and monitored. If users miss baits in the database they can request to add them to the database or may add them by themselves. The manufacturers may also add baits so that they can release and update their baits in the database themselves. The bait may manually be selected by the user from a database of baits or detected using one of or several of:
   Image recognition: the user takes a picture of the bait using the camera 261 of the mobile device 200; the application in the device processes the image and looks up for similar baits for recognition,
   NFC (Near Filed Communication), each bait is provided with a unique transponder and the devices NFC antenna 262 detects the type of transponder related to the bait,
   Barcode/QR-code: each bait may be provided with a barcode/QR code. The user uses the camera and scans the barcode which is processed and recognized by a program,
   Name/number: the user may enter a name or number, or the name/number may be scanned and recognized by OCR processing.
3. Rod used: May manually be selected by the user from a database of baits or detected using one of or several of:
   Image recognition: the user takes a picture of the rod using the camera 261 of the mobile device 200; the application in the device processes the image and looks up for similar rods for recognition,
   NFC (Near Filed Communication), each rod is provided with a unique transponder and the devices NFC antenna 262 detects the type of transponder related to the rod,
   Barcode/QR-code: each rod may be provided with a barcode/QR code. The user uses the camera and scans the barcode which is processed and recognized by a program,
   Name/number: the user may enter a name or number, or the name/number may be scanned and recognized by OCR processing.
   Connected to the user profile and selected automatically.
4. Fishing method: may manually selected by the user from database of fishing methods;
5. Position: may be collected from the mobile device's GPS unit (or any other positioning unit) continuously or at a pre-defined interval(s).
6. Time and date: may be collected from the mobile device.
7. Weather: may be entered by user or be collected from a weather service database.
8. Moon Phase: may be collected from a moon phase service or entered by the user or image recognition.
9. Sun Phase: may be collected from a moon phase service or entered by the user.
10. Water type: may be collected from a map service database or entered by the user or detected by a detector connectable to the mobile device.
11. Fishing Spot: collected from a weather service
12. Water Visibility: may be manually selected/entered by the user or image analyzed using an image taken by the camera;
13. Chlorophyll: may be manually entered by the user or detected using a detector connected to the device.
14. Oxygen: may be manually entered by the user or detected using a detector connected to the device.

15. Phosphorous: may be manually entered by the user or detected using a detector connected to the device.
16. Nitrogen: may be manually entered by the user or detected using a detector connected to the device.
17. Trofi: may be manually entered by the user or detected using a detector connected to the device.
18. pH-Value: may be manually entered by the user or detected using a detector connected to the device.
19. Salinity: may be entered by user or be collected from a weather service database.
20. Current: may be entered by user or be collected from a weather service database or detected by a detector connectable to the mobile device.
21. Altitude: may be collected from the mobile device's GPS unit (or any other positioning unit).
22. Tide: may be entered by the user or be collected from a service database.

The database mentioned in the above examples may be in the memory of the mobile device or collected from the database of the server.

Above are just a number of important parameters that can be used. Of course other parameters essential for the activity may also be provided.

Following is some data that may be collected when the user is logging a catch:
1. Species caught: may be manually selected by the user from the database of fish species, the species fished for is pre-selected or image recognition through an image captured by the camera of the mobile device.
2. Bait used: may be manually selected by the user from the database of baits, the bait selected in the fishing trip may be pre-selected or recognised/detected as mentioned above.
3. Weight: may be manually entered by the user or received from a scale
4. Length: may be manually entered by the user or detected through image recognition.
5. If the fish was kept or returned "Catch and Release": may be manually selected by the user;
6. Picture(s): may be added using the camera on the mobile device;
7. Fishing method used: may be manually selected by the user from database of fishing methods, the fishing method selected in the fishing trip may be pre-selected.
8. Position: may be collected from the mobile device's positioning arrangement.
9. Time and date: may be collected from the mobile device.
10. Weather: may be collected from a weather service.
11. Moon phase: may be collected from a moon service.
12. Sun phase: may be collected from a sun service.
13. Bottom- and catch depth: may be manually entered by the user or collected from a map database.
14. Water type: may be collected from a map service, the water type selected in the fishing trip is pre-selected.
15. Fishing Spot: may be collected from a third party weather service, the spot selected in the fishing trip is pre-selected.
16. Water visibility: may be manually selected by the user from the database of water visibilities, the visibility selected in the fishing trip is pre-selected.
17. Speed of bait: manually selected from database of Bait speed intervals.
18. Chlorophyll: may be manually entered by the user or detected using a detector connected to the device.
19. Oxygen: may be manually entered by the user or detected using a detector connected to the device.
20. Phosphorous: may be manually entered by the user or detected using a detector connected to the device.
21. Nitrogen: may be manually entered by the user or detected using a detector connected to the device.
22. Trofi: may be manually entered by the user or detected using a detector connected to the device.
23. pH-Value: may be manually entered by the user or detected using a detector connected to the device.
24. Salinity: may be entered by user or be collected from a weather service database.
25. Current: may be entered by user or be collected from a weather service database or detected by a detector connectable to the mobile device.
26. Altitude: may be collected from the mobile device's GPS unit (or any other positioning unit).
27. Tide (collected from a third party tide service, the tide selected in the fishing trip is pre-selected)

If the user does not have data connection when fishing the data will be stored locally on the mobile device and sent to the database when the user has a data connection. In this case the missing information, e.g. weather, moon/sun phases, etc. with need of data connection will be filled when a connection is available.

The user may also select to hide the position data so that other users cannot view it.

Figure 4:
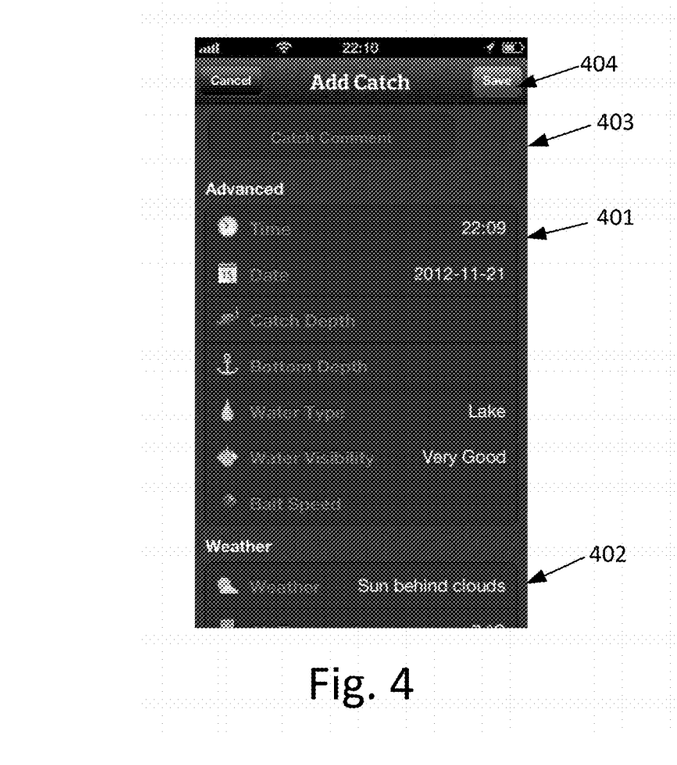
FIGS. 4-7 illustrate exemplary display layouts of a mobile device application according to the present invention.

FIG. 4 is illustrates one example of display input field layout of a mobile device comprising a field 401 for data input, such as date and time, a field 402 regarding the weather data, and a field 403 for additional commentaries. The data is saved and/or transmitted to the server when save button 404 is pushed.

Figure 5:
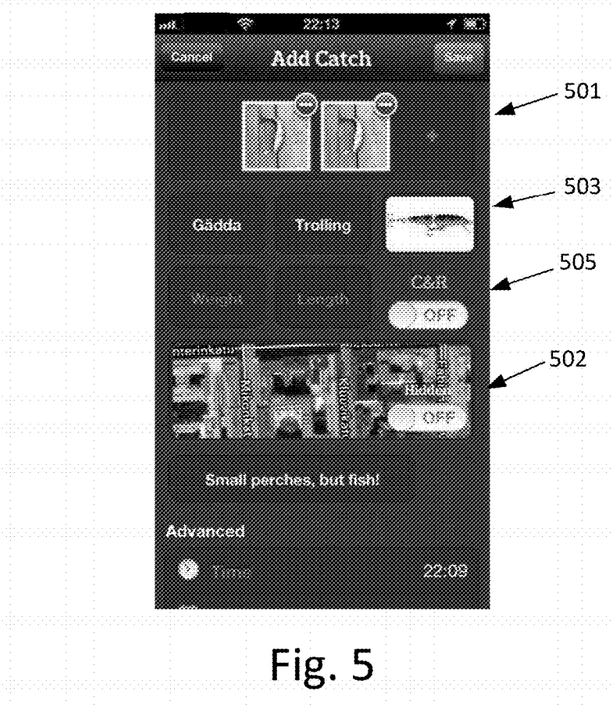

FIG. 5 is illustrates one example of display input field layout of a mobile device for inputting catch comprising a field 501 fish image input, a field 502 for position (hidden in this case), a field 503 for fish type, fishing type and bate (acquired as described earlier) and field 504 for additional data such as length, weight etc.

Figure 6:
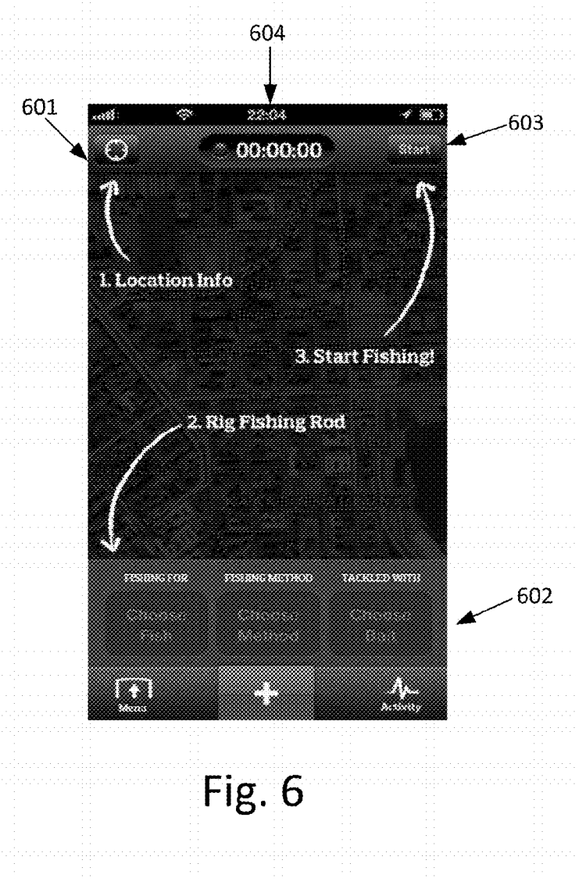

FIG. 6 is one example of display input field layout of a mobile device for starting a fishing trip. The user may collect position data 1 in position field 601, input 2 fish type (from database, depending on the position available fishes etc.) and bait in the input field 602 and start fishing by pushing start button. A timer 604 may be used to log fishing time length or time to catch a fish.

Figure 7:
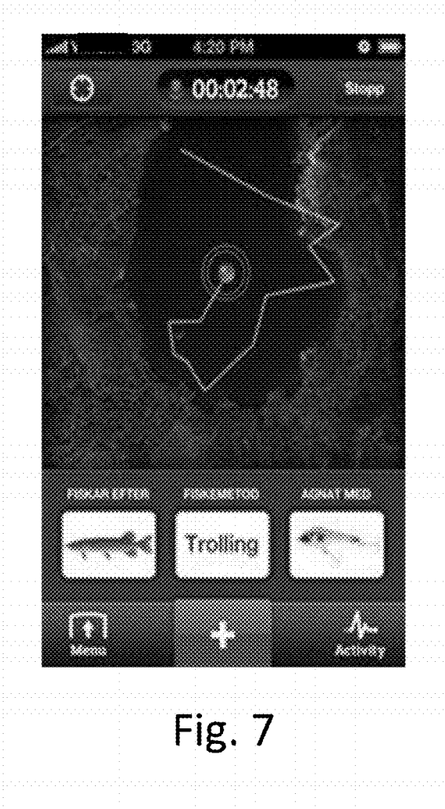

FIG. 7 is one example of display layout of a mobile device for illustrating the movement of the anger over a lake logged by the positioning device of the mobile device.

The invention further allows accessing others fishing adventures on line and in real time. This is possible by building a so-called social network for the users of the application. Thus, one user may login and follow other users (if they allow) in their activity, get comments or provide comments etc.

Figure 8:
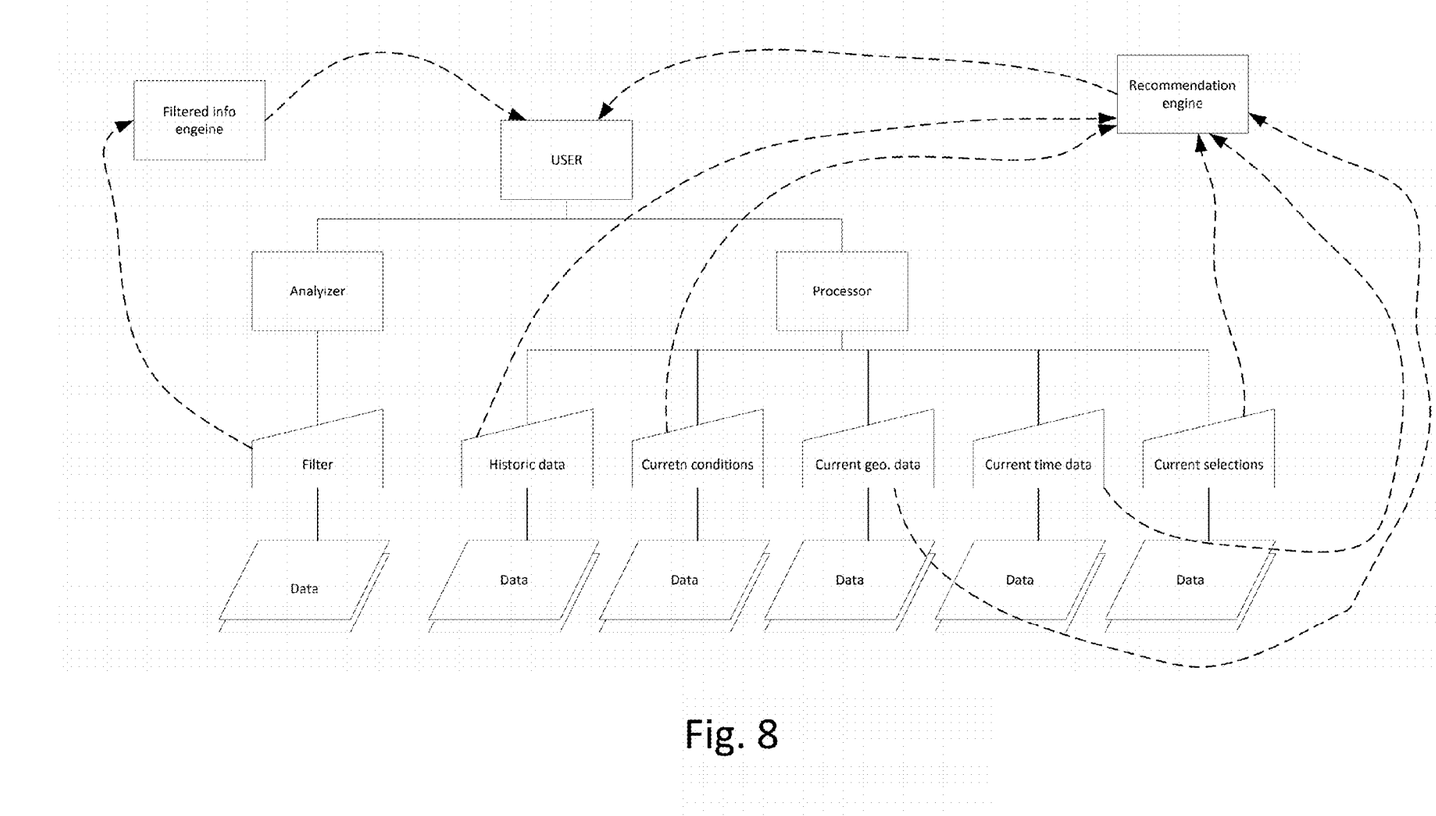
FIG. 8 illustrates a flow diagram illustrating exemplary processing by the system of FIG. 1, FIGS. 9-11 illustrate exemplary display layouts of a mobile device application according to the present invention.

The invention may, with respect to the collected data, and using a recommendation engine provide the user with recommendations to catch more and bigger fish. FIG. 8 illustrates a simplified flow chart of one exemplary method of making and providing decisions. The system analyses a number of data: provided by the user, from the database, from service providers and assembles an information and/or recommendations to a user(s).

The data comprises the data listed above. A user may filter the data using a filter function to specify especial relevant information. The system uses data such as data 1-22 listed earlier relevant for the activity. The analyser may with respect to the filtered information from the user provide relevant information for the user.

The recommendation engine processes data from one or several of: historic data, current data, current geographic data, current time data and current selections and provides the user with recommendations.

There are several recommendation alternatives, e.g. in the fishing application:

Before Fishing:

The user sets the species he wants to catch and some parameters, for example that the place to fish should be within a radius of certain distance, fishing method, time span he can fish etc. The user also may select if he wants to optimize for catching as many fishes as possible, for eating, size, or for record catches.

During Fishing:

The user selects if he want to optimize for catching as many fishes as possible, for eating size, or for record catches and the system analyses current and historical conditions, map position, catches and fishing data and recommends the best strategy, hot fishing areas and bait (from what is available in the user's tackle box).

During a fishing trip the recommendation engine constantly analyzes historical and current weather, geographic and fishing data. When it detects a pattern it gives recommendations to the angler on how to optimize the fishing and increase the catch results.

The recommendations are calculated using algorithms that operate on the current conditions and the historical fishing data collected by all users. The algorithms and methods used for the recommendations are constantly evaluated and improved and can be but not limited to AI-techniques such as neural networks and genetic programming.

The system may store everything the anglers log and turn it to understandable statistics. Anglers can browse historical statistics and compare with each other.

All catches and other data in a fishing trip may be connected to a global directory of Fishing Spot. A fishing spot can be a pond, stream, ocean, lake and more. The system of the invention connects catches and stores fishing data from fishing spots around the world and converts it to valuable fishing analyzes for anglers.

The system will include statistics over every catch reported in each Fishing Spot around the world.

Figure 9:
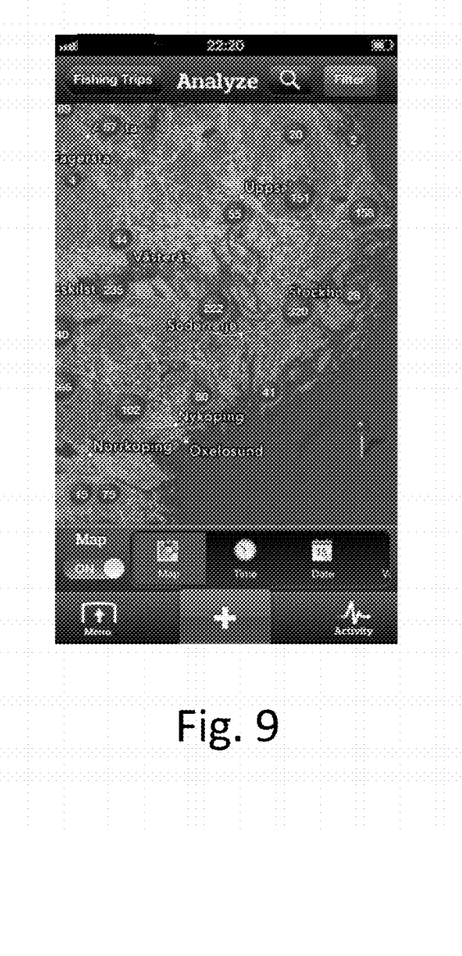
Figure 10:
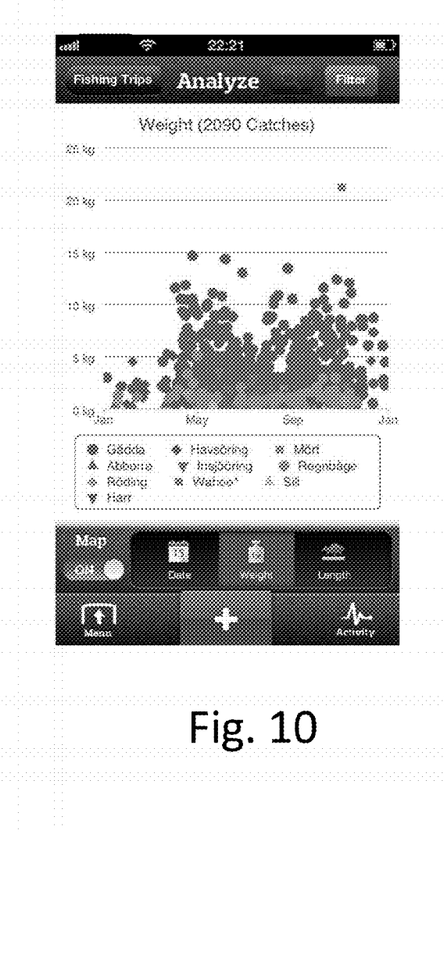
Figure 11:
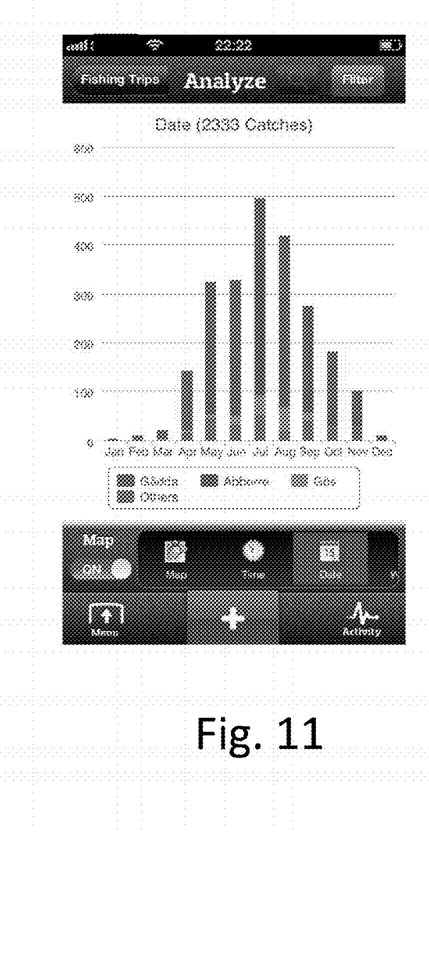

FIGS. 9 to 11 illustrate examples of statistical information processed and provided by the system based on the data received from users. FIG. 9 illustrates number of fishes caught in a region. FIG. 10 illustrates graphics over relation between date (monthly) and weight and type of the cached fishes. FIG. 11 illustrates graphics over relation between date (monthly), and number and type of the cached fishes.

In one embodiment, a user may define T a virtual copy of the anglers physical tackle box. It is a user selected list of baits from the bait database. It saves valuable time when changing baits during fishing trip logging and adding a catch.

In one embodiment all rods and reels from commercial brands may be available. Users can connect fishing equipment to their profiles and become inspired be other anglers gears.

All fish species may be stored with local names in each country. This will enable anglers around the world to compare catches and fishing data without the language barrier.

To give users extra motivation to log their fishing, rewarding stars and badges for their profiles are received if meeting targets. They can be for example:

Mission completed: your first logging session is done!

Carpe Diem: Caught a Carp over 10 kg

Full House!: Caught 2 of one species and 3 of another on the same trip

Etc.

In one embodiment, the anglers can set up own goals for their fishing. The goals can for example be "Catch 100 pikes this year" or "Catch over 50 fish species in 2 month".

The system will follow the progress and inform the angler of the results.

As in the popular social network a user can start to follow other members. An activity view may then update with the fishing of the anglers one follows. When following an angler a notification is also sent when they start fishing, add a catch, moment or comment. It is possible to open hidden map positions to trusted followers. One can share secret fishing spots with a few, many or none of the followers.

The user can select to receive push notifications for certain events generated by users that one follows or by the system. Notifications are received even if the mobile application is not running on the mobile device.

Parties interested in reaching users of the system such as fishing guides, resellers of fishing equipment (physical and online stores), manufacturers, and travel services will be able to present targeted ads and offerings in the application on the mobile device and on the systems website.

The system will be provided with extensive information about the angling habits of its members; this can be used to precision target ads, offers and deals.

By setting up campaigns with big angling resellers, targeted offers can be made:

A fly-fisher, for example, who doesn't have the statistically most effective flies used in his area, can get an offer to buy flies.

A sea angler, for example, who does big game trolling, can get an offer for a deep sea fishing vacation in time before the tuna season.

Fishers who finish fishing trips with in a reasonable distance from a reseller location, during business hours, can get a special offer to lure them to stop by.

Figure 12:
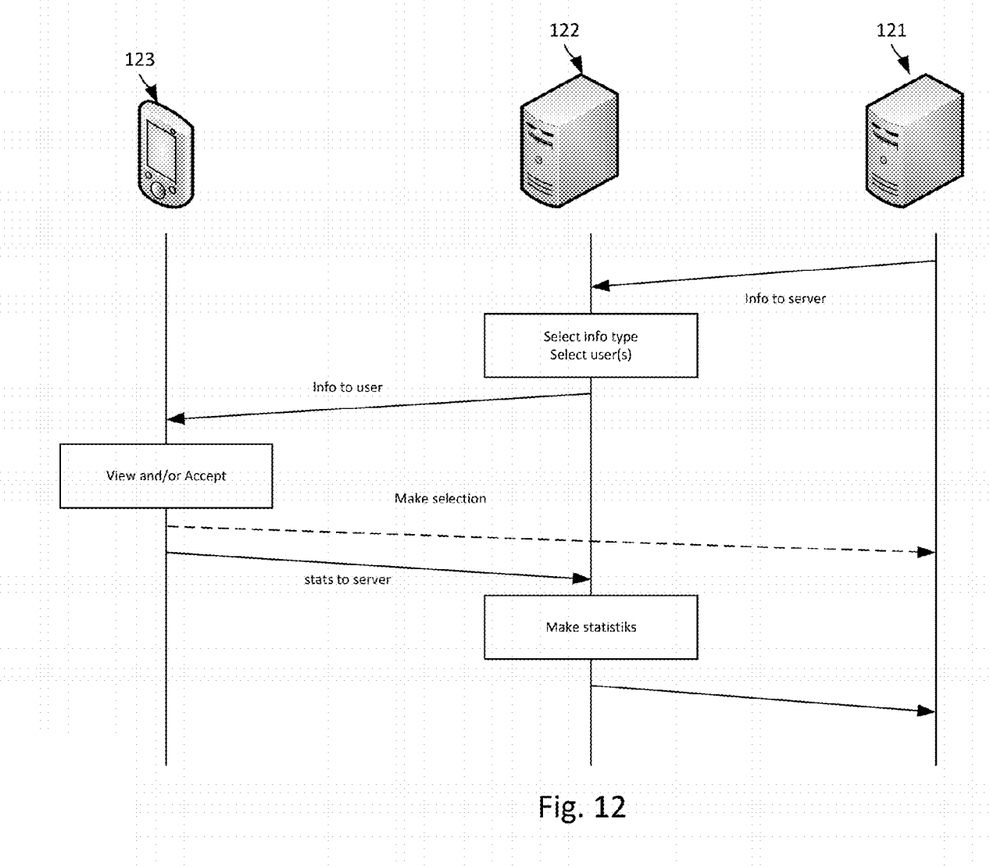
FIG. 12 illustrates a flow diagram illustrating exemplary communication steps by the system of FIG. 1.

FIG. 12 illustrates flow of providing relevant information, e.g. from a reseller, to one or several users or user groups. The reseller 121 provides the server of the system 122 with data to be provided to users, the server may analyze the information or reseller request to find out a group or a user of interest, e.g. fishing type and/or geographical position. The information may be packaged or combined with other information/offers and sent to the user/users 123. The application on the mobile device logs that the user has seen the info, accepted an offer and/or made a decision to buy a product in the information (directly to the reseller or through server 121) and provides the server with data on logging. The server may make statistics on the handled information and send it (e.g. together with an invoice) to the reseller.

The user may wear and connect an Augmented Reality (AR) glasses to be able to make logging with the glasses and voice command so that the user may have both hands free for fishing all the time. Users can use AR to find hot fishing areas in lakes and historical catch positions and data. In one embodiment a user may be provided with Virtual Reality (VR) devices to follow other users during their fishing trip or simulate a fishing trip.

In one embodiment, the mobile device app can wirelessly connect to standard sonars for angling. The app sends 3-dimensional underwater geo information to the system server, 3D catch positions are also sent. The data is merged from all users using sonars to create 3D underwater maps with historical catch positions and data.

Using pattern recognition of fish's skin patterns by recording an image using the camera of the mobile device, the identity of individual fish can be stored. When they are caught and released several times. Positions and conditions for the catch-moments can be compared and analyzed.

The service provider of the system may arrange competitions and the users can be charged for participation in the contest. A user may apply for participation through the mobile app or the website, pay entry fee and participate in the competition together with other anglers. Different types and categories of competitions are possible, e.g. largest fish, number of fishes, etc., and for example three winners may be appointed for each category with prices, e.g. from sponsors or resellers (which also may pay).

The application on the mobile device may also be used as fishing permit or license connected to the unique identity of the device or provided as a readable file.

In one embodiment, the user may store all relevant information about a fishing region in the mobile device to be used if data connection is missing or is poor.

The above examples for fishing may also be applied for hunting, thus changing rods and baits with guns and bullets (or other hunting gears), and fishes with preys.

In an application for searching mushroom picking, the information about different types of mushrooms may be provided. Image recognition may be used to select mushrooms avoiding poisonous ones and provide information, e.g. position of poisonous mushrooms to other users.

A "device" as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc.

The various embodiments of the present invention described herein is described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention, have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A system for gathering and assembling information, the system comprising:
    a mobile device having a processor configured to:
        use near field communication to detect a unique type of transponder of a tool for use by a user of the mobile device for carrying out an activity including fishing, the tool being a fishing rod or bait,
        identify the tool using the detected unique type of transponder, and
        send data relating to at least a position of the mobile device and information identifying the tool,
    a server computer having:
        a communicator for communicating with the mobile device and receiving the sent data, and
        a central processing unit configured to:
            communicate with said communicator to retrieve the position data and the information identifying the tool,
            retrieve data for the tool,
            retrieve historical information for the activity based on the position data, and
            generate a unique data set based on said environmental information, the position data, and the historical information, said unique data set comprising optimization data usable by users of the system for carrying out said activity comprising one or several of position, tools and methods corresponding to said activity.

2. The system according to claim 1, wherein said central processing unit is configured to provide mobile devices of one or several users with data on other users, their activity and statistical information.

3. The system of claim 1, wherein said mobile device comprises an image recorder for recognition of an object of the activity.

4. The system of claim 3, wherein the object is a type of fish.

5. The system of claim 4, wherein the object is a type of fishing rod, and the type of fishing rod is detected by:
- processing an image of the fishing rod and looking up for similar rods for recognition,
- scanning a name or number and using by OCR processing, or
- connecting to a user profile and selecting a rod from the user profile automatically.

6. The system of claim 3, wherein the object is a type of bait, and the type of bait is detected by:
- processing an image of the bait captured by the image recorder and looking up for similar baits for recognition, or
- scanning a name or number using the image recorder and using OCR processing.

7. The system of claim 4, further comprising the bait, and wherein the bait includes a barcode or QR code, and the processor is further configured to a type of the bait using the barcode or QR code of the bait.

8. The system of claim 1, wherein said mobile device further includes a near field communication antenna and the unique type of transponder is detected using the antenna.

9. The system of claim 1, wherein said processing unit is configured to process data from one or several of: historic data, current data, current geographic data, current time data and current selections from the mobile device and provide the mobile device with one or several data relating to a geographical position, physical tool, and environmental information.

10. The system of claim 1, wherein the mobile device is configured for Augmented Reality or Virtual Reality.

11. The system of claim 1, wherein the mobile device comprises a chemical detector for detecting the environmental data.

12. The system of claim 1, further comprising the bait, and wherein the bait includes a unique transponder corresponding to the unique type of the transponder.

13. The system of claim 1, further comprising the rod, and wherein the rod includes a unique transponder corresponding to the type of the transponder.

* * * * *